(12) United States Patent
Widger et al.

(10) Patent No.: US 11,143,930 B2
(45) Date of Patent: Oct. 12, 2021

(54) DRIVING METHODS FOR VARIABLE TRANSMISSION ELECTRO-PHORETIC MEDIA

(71) Applicant: E Ink Corporation, Billerica, MA (US)

(72) Inventors: Peter Carsten Bailey Widger, Nashua, NH (US); George G. Harris, Woburn, MA (US); Richard J. Paolini, Jr., Framingham, MA (US); Craig Alan Breen, Arlington, MA (US)

(73) Assignee: E Ink Corporation, Billerica, MA (US)

( * ) Notice: Subject to any disclaimer, the term of this patent is extended or adjusted under 35 U.S.C. 154(b) by 219 days.

(21) Appl. No.: 16/446,845

(22) Filed: Jun. 20, 2019

(65) Prior Publication Data

US 2020/0004099 A1 Jan. 2, 2020

Related U.S. Application Data

(60) Provisional application No. 62/691,285, filed on Jun. 28, 2018, provisional application No. 62/784,897, filed on Dec. 26, 2018.

(51) Int. Cl.
*G02F 1/1685* (2019.01)
*G02F 1/167* (2019.01)

(52) U.S. Cl.
CPC ............ *G02F 1/1685* (2019.01); *G02F 1/167* (2013.01)

(58) Field of Classification Search
CPC .................. G02F 1/167; G02F 1/1676; G02F 2001/1678; G02F 1/16757;
(Continued)

(56) References Cited

U.S. PATENT DOCUMENTS 4,418,346 A 11/1983 Batchelder
5,872,552 A 2/1999 Gordon, II et al.
(Continued)

FOREIGN PATENT DOCUMENTS

| EP | 1462847 A1 | 9/2004 |
|---|---|---|
| KR | 20120011532 A | 2/2012 |
| WO | 2004079442 A1 | 9/2004 |

OTHER PUBLICATIONS

Kitamura, T. et al., "Electrical toner movement for electronic paper-like display", Asia Display/IDW '01, pp. 1517-1520, Paper HCS1-1 (2001).

(Continued)

*Primary Examiner* — Brandi N Thomas
(74) *Attorney, Agent, or Firm* — Brian D. Bean (57) ABSTRACT

A method of driving a variable transmission film is provided and a variable transmission device including the film and a controller configured to drive the film. The film may include a layer of electrophoretic material and at least one electrode, the electrophoretic material including a fluid containing a plurality of charged particles capable of moving through the fluid upon application of an electric field by the at least one electrode. The method may include applying a first voltage waveform to the film at an initial optical state and applying a second voltage waveform having a lower frequency and shorter pulse duration than the first voltage waveform to switch the film to a final optical state, wherein the film has a higher percent transmission at the initial optical state than the final optical state.

15 Claims, 5 Drawing Sheets

(58) Field of Classification Search
CPC .......... G02F 2202/022; G02F 2202/28; G02F 1/1677; G02F 1/16756; G02F 1/1679; G02F 1/1685
See application file for complete search history.

(56) References Cited

U.S. PATENT DOCUMENTS

| | | | |
|---|---|---|---|
| 6,130,774 | A | 10/2000 | Albert et al. |
| 6,144,361 | A | 11/2000 | Gordon, II et al. |
| 6,172,798 | B1 | 1/2001 | Albert et al. |
| 6,184,856 | B1 | 2/2001 | Gordon, II et al. |
| 6,225,971 | B1 | 5/2001 | Gordon, II et al. |
| 6,241,921 | B1 | 6/2001 | Jacobson et al. |
| 6,271,823 | B1 | 8/2001 | Gordon, II et al. |
| 6,672,921 | B1 | 1/2004 | Liang et al. |
| 6,788,449 | B2 | 9/2004 | Liang et al. |
| 6,866,760 | B2 | 3/2005 | Paolini Jr. et al. |
| 6,922,276 | B2 | 7/2005 | Zhang et al. |
| 6,982,178 | B2 | 1/2006 | LeCain et al. |
| 7,002,728 | B2 | 2/2006 | Pullen et al. |
| 7,012,600 | B2 | 3/2006 | Zehner et al. |
| 7,072,095 | B2 | 7/2006 | Liang et al. |
| 7,075,502 | B1 | 7/2006 | Drzaic et al. |
| 7,116,318 | B2 | 10/2006 | Amundson et al. |
| 7,144,942 | B2 | 12/2006 | Zang et al. |
| 7,170,670 | B2 | 1/2007 | Webber |
| 7,236,291 | B2 | 6/2007 | Kaga et al. |
| 7,312,784 | B2 | 12/2007 | Baucom et al. |
| 7,321,459 | B2 | 1/2008 | Masuda et al. |
| 7,327,511 | B2 | 2/2008 | Whitesides et al. |
| 7,369,299 | B2 | 5/2008 | Sakurai et al. |
| 7,411,719 | B2 | 8/2008 | Paolini, Jr. et al. |
| 7,453,445 | B2 | 11/2008 | Amundson |
| 7,495,819 | B2 | 2/2009 | Sakurai et al. |
| 7,525,719 | B2 | 4/2009 | Yakushiji et al. |
| 7,535,624 | B2 | 5/2009 | Amundson et al. |
| 7,646,358 | B2 | 1/2010 | Hattori et al. |
| 7,646,530 | B2 | 1/2010 | Takagi et al. |
| 7,679,814 | B2 | 3/2010 | Paolini, Jr. et al. |
| 7,715,088 | B2 | 5/2010 | Liang et al. |
| 7,839,564 | B2 | 11/2010 | Whitesides et al. |
| 7,999,787 | B2 | 8/2011 | Amundson et al. |
| 8,009,348 | B2 | 8/2011 | Zehner et al. |
| 9,279,906 | B2 | 3/2016 | Kang |
| 9,495,918 | B2 | 11/2016 | Harrington et al. |
| 9,777,201 | B2 | 10/2017 | Widger et al. |
| 10,067,399 | B2 | 9/2018 | Lim et al. |
| 10,109,226 | B2 | 10/2018 | Joo et al. |
| 2006/0087479 | A1 | 4/2006 | Sakurai et al. |
| 2006/0087489 | A1 | 4/2006 | Sakurai et al. |
| 2006/0209008 | A1 | 9/2006 | Nihei et al. |
| 2006/0214906 | A1 | 9/2006 | Kobayashi et al. |
| 2007/0268245 | A1* | 11/2007 | Sugita .................. G09G 3/3446 345/107 |
| 2009/0140138 | A1* | 6/2009 | Vandermey .......... G01N 27/624 250/282 |
| 2015/0005720 | A1 | 1/2015 | Zang |
| 2015/0277160 | A1 | 10/2015 | Laxton |
| 2016/0012710 | A1 | 1/2016 | Lu et al. |

OTHER PUBLICATIONS

Yamaguchi, Y. et al., "Toner display using insulative particles charged triboelectrically", Asia Display/IDW '01, pp. 1729-1730, Paper AMD4-4 (2001).

Murtsovkin, V.A., "Nonlinear Flows near Polarized Disperse Particles", Colloid Journal, vol. 58, No. 3, pp. 358-367 (Nov. 14, 1996).

Squires, T. M. et al. "Breaking symmetries in induced-charge electro-osmosis and electrophoresis," J Fluid Mech., vol. 560, pp. 65-101 (Aug. 20, 2006).

Gangwal, Sumit et al., "Induced-charge Electrophoresis of Metallodielectric Particles", Physical Review Letters, vol. 100, No. 5, (Mar. 2008).

Korean Intellectual Property Office, PCT/US2019/038117, International Search Report and Written Opinion, dated Oct. 2, 2019.

* cited by examiner

DRIVING METHODS FOR VARIABLE TRANSMISSION ELECTRO-PHORETIC MEDIA

CROSS-REFERENCE TO RELATED APPLICATIONS

This application claims the benefit of and priority to U.S. Provisional application having Ser. No. 62/691,285 filed on Jun. 28, 2018 and U.S. Provisional application having Ser. No. 62/784,897 filed on Dec. 26, 2018, the contents of which are incorporated by reference herein in their entireties.

BACKGROUND OF THE INVENTION

This invention relates to light modulators, that is to say to variable transmission windows, mirrors and similar devices designed to modulate the amount of light or other electromagnetic radiation passing therethrough; for convenience, the term "light" will normally be used herein, but this term should be understood in a broad sense to include electromagnetic radiation at non-visible wavelengths. For example, as mentioned below, the present invention may be applied to provide windows which can modulate infra-red radiation for controlling temperatures within buildings. More specifically, this invention relates to light modulators which use particle-based electrophoretic media to control light modulation. Examples of electrophoretic media that may be incorporated into various embodiments of the present invention include, for example, the electrophoretic media described in U.S. patent application having Ser. No. 16/008,180 (filed on Jun. 14, 2018) and U.S. patent application having Ser. No. 16/008,230 (filed on Jun. 14, 2018), the contents of which are incorporated by reference herein in their entireties.

Particle-based electrophoretic displays, in which a plurality of charged particles move through a suspending fluid under the influence of an electric field, have been the subject of intense research and development for a number of years. Such displays can have attributes of good brightness and contrast, wide viewing angles, state bistability, and low power consumption when compared with liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. patent application Ser. No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

As noted above, electrophoretic media require the presence of a suspending fluid. In most prior art electrophoretic media, this suspending fluid is a liquid, but electrophoretic media can be produced using gaseous suspending fluids; see, for example, Kitamura, T., et al., "Electrical toner movement for electronic paper-like display", IDW Japan, 2001, Paper HCS1-1, and Yamaguchi, Y, et al., "Toner display using insulative particles charged triboelectrically", IDW Japan, 2001, Paper AMD4-4). See also European Patent Applications 1,429,178; 1,462,847; and 1,482,354; and International Applications WO 2004/090626; WO 2004/079442; WO 2004/077140; WO 2004/059379; WO 2004/055586; WO 2004/008239; WO 2004/006006; WO 2004/001498; WO 03/091799; and WO 03/088495. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT), E Ink Corporation, E Ink California, LLC and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Microcell structures, wall materials, and methods of forming microcells; see for example U.S. Pat. Nos. 7,072,095 and 9,279,906;
(d) Methods for filling and sealing microcells; see for example U.S. Pat. Nos. 7,144,942 and 7,715,088;
(e) Films and sub-assemblies containing electro-optic materials; see for example U.S. Pat. Nos. 6,982,178 and 7,839,564;
(f) Backplanes, adhesive layers and other auxiliary layers and methods used in displays; see for example U.S. Pat. Nos. 7,116,318 and 7,535,624;
(g) Color formation and color adjustment; see for example U.S. Pat. Nos. 7,075,502 and 7,839,564;
(h) Methods for driving displays; see for example U.S. Pat. Nos. 7,012,600 and 7,453,445;
(i) Applications of displays; see for example U.S. Pat. Nos. 7,312,784 and 8,009,348; and
(j) Non-electrophoretic displays, as described in U.S. Pat. No. 6,241,921 and U.S. Patent Applications Publication No. 2015/0277160; and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published U.S. application Ser. No. 2002/0075556, both assigned to Sipix Imaging, Inc.

Figure 5A:
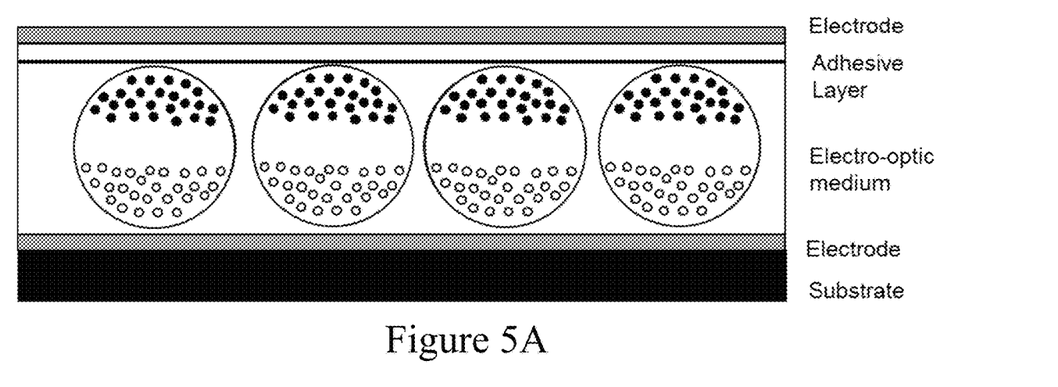
FIG. 5A is an illustration of an electro-optic display including two types of charged particles. The particles can be moved toward (away) from a viewer with the application of an electric field.
Figure 5B:
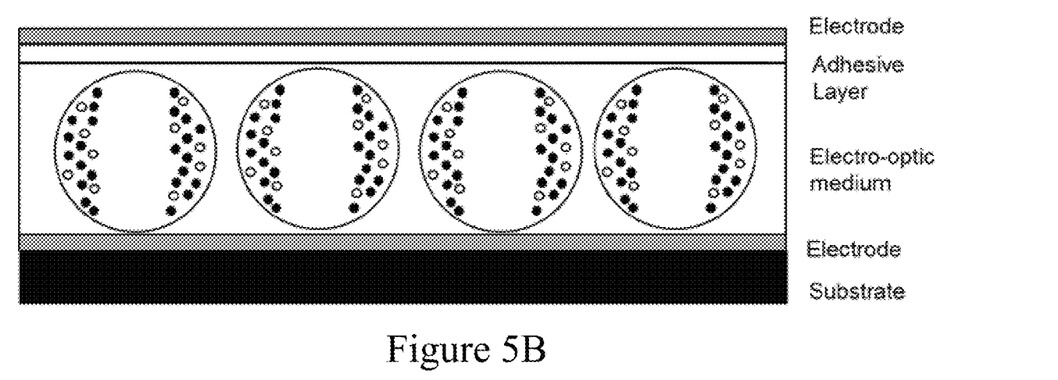
FIG. 5B is an illustration of a variable transmission device including first and second light-transmissive electrode layers with an electro-optic medium disposed between the layers. The particles can be moved adjacent to the capsule walls with the application of an electric field, thereby allowing light to pass through the medium.

Electrophoretic media are often opaque (since, for example, in many electrophoretic media, the particles substantially block transmission of visible light through the display) and operate in a reflective mode. This functionality is illustrated in FIG. 5A, where the reflectivity of light striking a surface is modulated by moving black or white charged particles toward a viewing surface with a suitable voltage. However, electrophoretic devices can also be made to operate in a so-called "shutter mode," in which one display state is substantially opaque and one is light-transmissive. See, for example, the aforementioned U.S. Pat. Nos. 6,130,774 and 6,172,798, and 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. A light transmissive state of a display is illustrated in FIG. 5B. When this "shutter mode" electrophoretic device is constructed on a transparent substrate, it is possible to regulate transmission of light through the device.

The devices of FIGS. 5A and 5B include electro-optic media that consists of capsules in a polymeric binder. The capsules contain charged black and/or white pigment particles that move in response to an electric field. The capsules are typically formed from gelatin materials described in greater detail below. The electro-optic medium is distributed between first and second electrode layers, which may be made from known materials such as indium-tin oxide (ITO) coated polyethylene terephthalate (PET). Alternatively, an electrode layer may comprise metal electrodes, which may be arranged as pixels. The pixels may be controllable as an active matrix, thereby allowing for the display of text and pictures. An additional adhesive layer is typically present between the electro-optic medium and one of the electrode layers. The adhesive layer may be UV curable, and typically improves the planarity of the final device by "filling in" deviations created by the capsules. Suitable adhesive formulations are described in U.S. 2017/0022403, which is incorporated by reference herein.

When a DC field is applied to the medium via the electrodes of the device of FIG. 5A using a power source and a controller (not shown), the dark or light particles move toward the viewing surface, thereby changing the optical state from dark to light. In FIG. 5B, when an alternating electric field is applied to one of the electrodes, the charged pigment particles are driven to the walls of the capsule, resulting in an aperture through the capsule for the transmission of light, i.e., an open state. In both embodiments, because the solvent is non-polar and comprises charge control agents and/or stabilizers, the optical state (black/white; open/closed) can be maintained for long periods of time (weeks) without the need to maintain the electric field. As a result, the devices may be "switched" only a couple of times a day and consume very little power.

An encapsulated or microcell electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition; and other similar techniques.) Thus, the resulting display can be flexible. Further, because the display medium can be printed (using a variety of methods), the display itself can be made inexpensively.

One potentially important market for electrophoretic media is windows with variable light transmission. As the energy performance of buildings and vehicles becomes increasingly important, electrophoretic media could be used as coatings on windows to enable the proportion of incident radiation transmitted through the windows to be electronically controlled by varying the optical state of the electrophoretic media. Effective implementation of such "variable-transmissivity" ("VT") technology in buildings is expected to provide (1) reduction of unwanted heating effects during hot weather, thus reducing the amount of energy needed for cooling, the size of air conditioning plants, and peak electricity demand; (2) increased use of natural daylight, thus reducing energy used for lighting and peak electricity demand; and (3) increased occupant comfort by increasing both thermal and visual comfort. Even greater benefits would be expected to accrue in an automobile, where the ratio of glazed surface to enclosed volume is significantly larger than in a typical building. Specifically, effective implementation of VT technology in automobiles is expected to provide not only the aforementioned benefits but also (1) increased motoring safety, (2) reduced glare, (3) enhanced mirror performance (by using an electro-optic coating on the mirror), and (4) increased ability to use heads-up displays. Other potential applications of VT technology include privacy glass and glare-guards in electronic devices.

The present invention relates to methods of driving particle-based electrophoretic media for use in variable transmission films.

SUMMARY OF THE INVENTION

In one aspect, the various embodiments of the present invention provide a method of driving a variable transmission film comprising a layer of electrophoretic material and at least one electrode, the electrophoretic material comprising a fluid containing a plurality of charged particles capable of moving through the fluid upon application of an electric field by the at least one electrode. The method may comprise applying a first voltage waveform to the film having an initial optical state and applying a second voltage waveform having a lower frequency and shorter pulse duration than the first voltage waveform to switch the film to a final optical state, wherein the film has a higher percent transmission at the initial optical state than the final optical state.

In another aspect, the various embodiments of the present invention provide a variable transmission device comprising at least one electrode, a layer of electrophoretic material comprising a fluid containing a plurality of charged particles capable of moving through the fluid upon application of an electric field by the at least one electrode, a controller connected to a power source and the at least one electrode, the controller being configured to drive the variable transmission film according to one of the driving methods disclosed herein.

These and other aspects of the present invention will be apparent in view of the following description.

The drawing Figures depict one or more implementations in accord with the present concepts, by way of example only, not by way of limitations.

DETAILED DESCRIPTION

In the light modulators of the present invention, the transparent state is brought about by field dependent aggregation of the electrophoretic particles; such field dependent aggregation may take the form of dielectrophoretic movement of electrophoretic particles to the lateral walls of a droplet (whether that droplet is present in a polymer-dispersed medium, or within a capsule or microcell), or "chaining", i.e., formation of strands of electrophoretic particles within the droplet, or possibly in other ways. Regardless of the exact type of aggregation achieved, such field dependent aggregation of the electrophoretic particles causes the particles to occupy only a small proportion of the viewable area of each droplet, when viewed in a direction perpendicular to the viewing surface through which an observer views the electrophoretic medium. In the light-transmissive or open state, the major part of the viewable area of each droplet is free from electrophoretic particles and light can pass freely therethrough. In contrast, in the non-light-transmissive or closed state, the electrophoretic particles are distributed throughout the whole viewable area of each droplet (the particles may be uniformly distributed throughout the volume of the suspending fluid or concentrated in a layer adjacent one major surface of the electrophoretic layer), so that no light can pass therethrough.

It can be shown by conventional theory that field dependent aggregation of the electrophoretic particles, and hence the formation of an open state, is promoted by application of high frequency fields (typically at least 10 Hz) to the electrophoretic medium, and by the use of irregularly shaped droplets, highly conductive electrophoretic particles, and a low conductivity, low dielectric constant suspending fluid. Conversely, dispersion of the electrophoretic particles into the suspending fluid or their concentration adjacent one major surface of the electrophoretic layer, and hence the formation of a closed state, is promoted by application of low frequency fields (typically less than 10 Hz) to the electrophoretic medium, and by the use of highly charged electrophoretic particles, higher conductivity, higher dielectric constant suspending fluid, and charged droplet walls.

In other words, to decrease closing time in a dielectrophoretic display (i.e., recovery from dielectrophoretic migration) or a stranding display (i.e., one in which the particles aggregate as in an electrorheological fluid), it is advantageous to vary both the operating voltage and the waveform, using a high frequency, high voltage waveform for opening the modulator and a low frequency, low voltage waveform for closing it. These changes in waveform can be coupled with either patterned electrodes or various conductive particle material, such as doped, metallic or semi-conductive materials, like those described in U.S. Pat. No. 7,327,511, to optimize the response in both directions.

An additional concern for variable transmission devices comprising capsules is grain. In this application "grain" refers to visual non-uniformities caused by several factors, such as clusters of colored binder or clumps/layers of capsules, capsule packing variability, voids, thickness variations, and coating defects including pinholes. These non-uniformities reduce visibility when a user looks through the device in the open state. The term "grain" originates in film photography, where early silver films were known to have clumps of silver that made a developed picture appear "grainy."

Variable transmission films made from microcapsules consist of microscopic areas that have differences in coat weight and degree of multi-layering and if the films are driven to their darkest states the differences in coat weight and packing can be viewed by a user as grain. One method for reducing the amount of grain in an encapsulated electrophoretic medium is by applying a driving method according to the various embodiments of the present invention.

According to one embodiment of the present invention, grain can be appreciably improved for a variable transmission window film containing encapsulated electrophoretic media by utilizing a driving method comprising applying a first waveform to a film having an initial optical state and then applying a second a waveform having a lower frequency and/or pulse duration until the film switches to a final optical state, the initial state having a higher percent transmission than the final state. For example, in one preferred embodiment, the method may comprise driving the electrophoretic media from an open state with a first waveform having a frequency of 10 Hz, an amplitude of 90 V and a duration of 1000 ms followed by a second waveform having a frequency of 2 Hz, an amplitude of 90 V, and a duration of 500 ms to arrive at a closed state.

Figure 1:
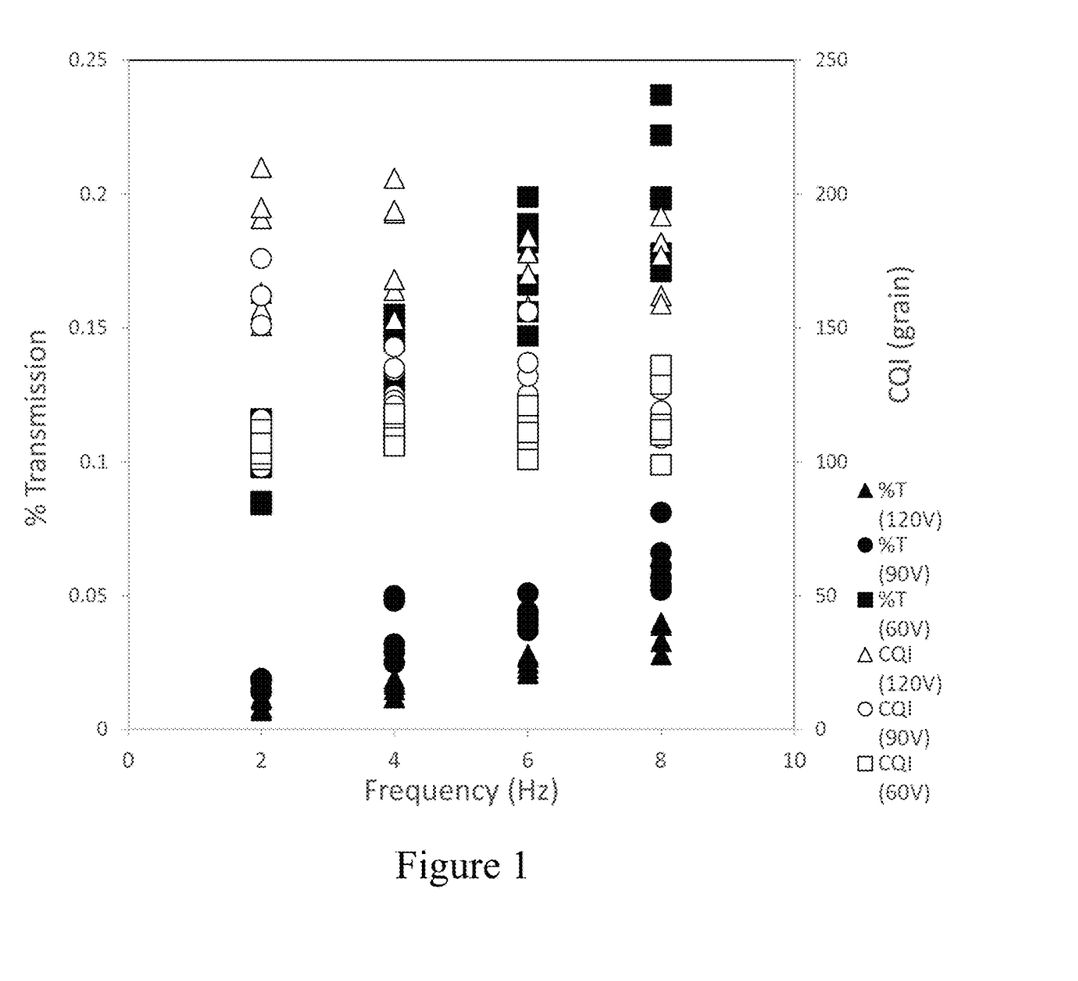
FIG. 1 is a plot providing the CQI and percent transmission (% T) of a variable transmission film when a driving waveform is applied according to an embodiment of the present invention at various amplitudes and frequencies.
Figure 2:
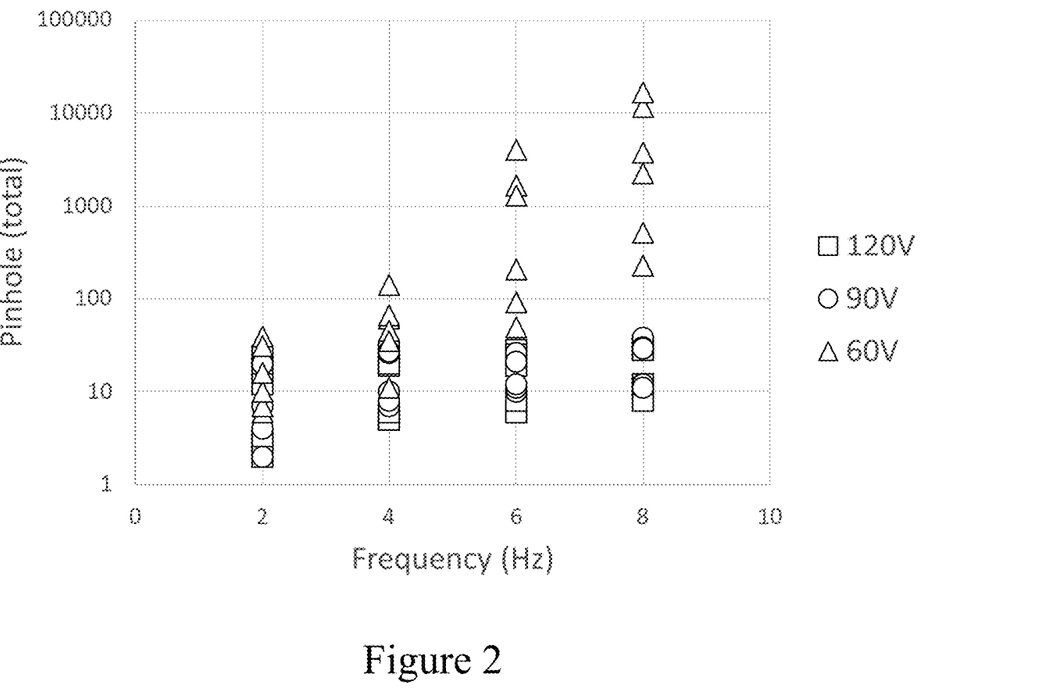
FIG. 2 is a plot providing the pinhole total of a variable transmission film when a driving waveform is applied according to an embodiment of the present invention at various amplitudes and frequencies.

FIGS. 1 and 2 provide the CQI, percent transmission (% T), and pinhole totals of films that were driven from an open state to a closed state with a first waveform followed by a second waveform, as follows:
1) the first waveform having a frequency of 10 Hz, an amplitude of X volts (X=60, 90, or 120 V) and a pulse duration of 1000 ms; and
2) the second waveform having a frequency of Y Hz (Y=2, 4, 6, or 8 Hz), an amplitude of X V (X=60, 90, or 120 V), and a pulse duration of 1000 ms.

The coating quality index (CQI) provides a measure of grain in which lower values indicate better uniformity. Pinhole totals are a count of points on the display having a diameter of at least 20 μm that have a higher transmissivity than the remainder of the display when the display is in a closed state. As demonstrated in FIG. 1, three distinct groups are shown based on the various driving voltages. At 120V the film reached its darkest states and the worst grain was observed. At 60V the film had low grain, but unacceptably high % T. At 90V the film did not achieve quite as low % T as at 120V, but the grain was more acceptable. Based on the results in FIGS. 1 and 2, it was found that all three properties (CQI, pinhole total, and % T) were improved using waveforms having lower frequencies. However, pinhole total and % T were improved at higher voltages, while CQI was improved at lower voltages.

Thus, it is preferred that the various embodiments of the present invention utilize at least two waveforms each having a frequency within the range of 0 to not more than, with increasing preference in the order given, 10, 9, 8, 7, 6, 5, 4, 3, 2, and 1 Hz. It is not necessary for the second waveform to have a frequency that is equal to the frequency of the first waveform. As previously mentioned, it is preferable that the frequency of the second waveform is less than the first waveform. Their respective frequencies may or may not be equal.

It is also preferred that the various embodiments of the present invention utilize at least two waveforms each having an amplitude at least, with increasing preference in the order given, 20, 25, 30, 35, 40, 45, 50, 55, 60, 65, 70, 75, 85, 90 V and not more than, with increasing preference in the order given, 150, 145, 140, 135, 130, 125, 120, 115, 110, 105, 100, 95, 90, 85, 80, 75, 70, 65, 60 V. It is not necessary for the second waveform to have an amplitude that is equal to the amplitude of the first waveform. Their respective amplitudes may or may not be equal.

Figure 3:
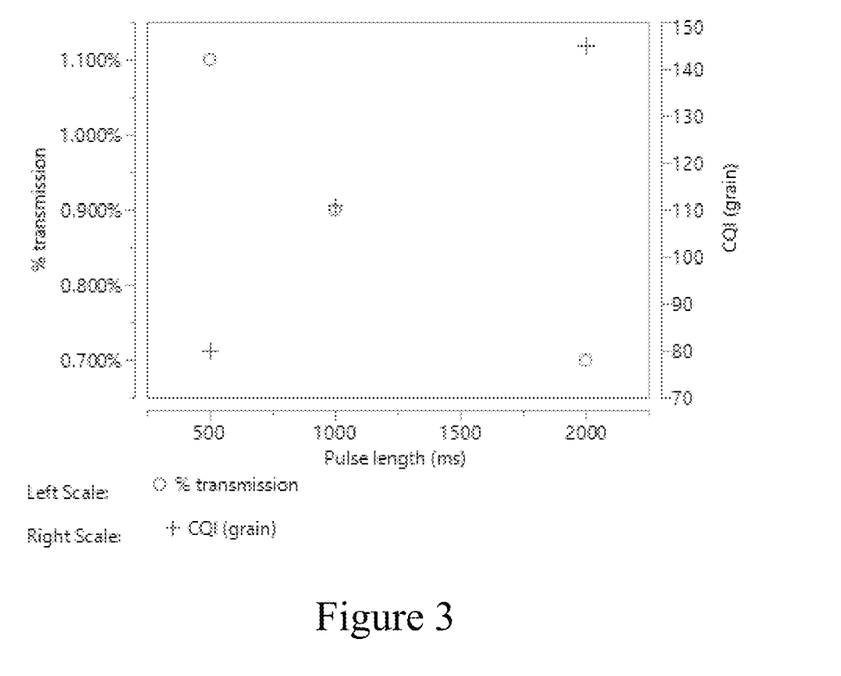
FIG. 3 is a plot showing the CQI and % T of a variable transmission film when the driving waveform is applied according to an embodiment of the present invention at various pulse durations.

Referring now to FIG. 3, the % T and CQI for a variable transmission film driven from its open state with a first waveform followed by a second waveform, as follows:
1) the first waveform having a frequency of 10 Hz, an amplitude of 90 V, and a pulse duration of 1000 ms;
2) the second waveform having a frequency of 2 Hz, an amplitude of 90 V, and a pulse duration of X ms (X=500, 100, or 2000 ms).

Figure 4A:
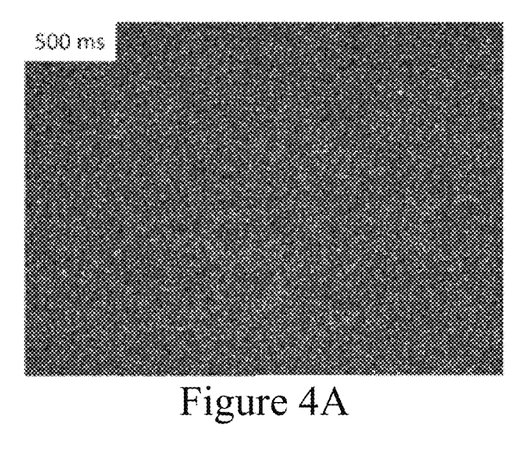
FIGS. 4A-4C are photomicrographs of the variable transmission film of FIG. 3.
Figure 4B:
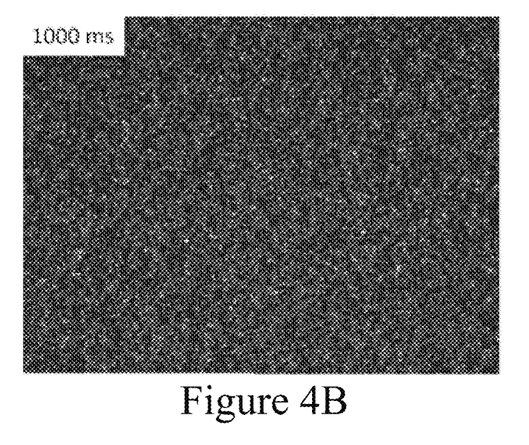
Figure 4C:
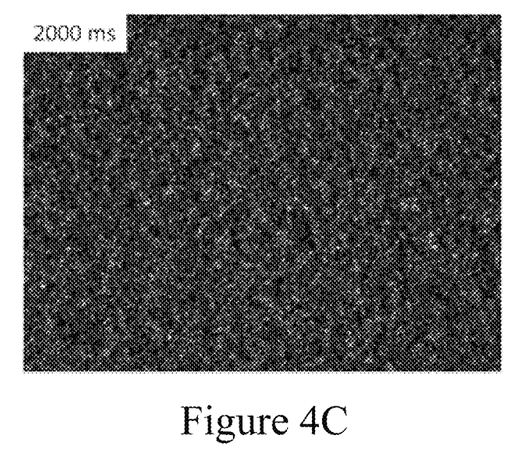

From the results shown in FIG. 3, it was observed that shorter drive pulses that produce slightly higher % T than the minimum of 0.7% achieved significantly lower grain. As the pulse length increased, % T improved; however CQI increased. FIGS. 4A-4C are photomicrographs demonstrating the optical state of the film at each pulse length from FIG. 3.

Thus, it is preferred that the various embodiments of the present invention utilize at least two waveforms each having a pulse duration not more than, with increasing preference in the order given, 1500, 1400, 1300, 1200, 1100, 1000, 900, 800, 700, 600, 500, 400, 300, 200, and 100 ms. It is not necessary for the second waveform to have a pulse duration that is equal to the duration of the first waveform. Their respective pulse durations may or may not be equal.

It is also preferred that the various embodiments of the present invention drive the variable transmission film to a closed state having a percent transmission not more than, with increasing preference in the order given, 1.5, 1.4, 1.3, 1.2, 1.1, 1.0, 0.9, 0.8, 0.7, 0.6, 0.5, 0.4, 0.3, 0.2 and 0.1%.

It will be apparent to those skilled in the art that numerous changes and modifications can be made in the specific embodiments of the present invention described above without departing from the scope of the invention. Accordingly, the whole of the foregoing description is to be construed in an illustrative and not in a limitative sense.

All of the foregoing published patents, publications, and pending applications are incorporated by reference herein in their entireties.

We claim:

1. A method of driving a variable transmission film comprising a layer of electrophoretic material disposed between two light-transmissive electrodes, the electrophoretic material comprising a fluid containing a plurality of charged particles capable of moving through the fluid upon application of an electric field between the two light-transmissive electrodes, the method comprising:
applying a first voltage waveform having a frequency from 1 to 10 Hz to the film having an initial optical state; and
applying a second voltage waveform having a lower frequency and shorter pulse duration than the first voltage waveform to switch the film to a final optical state, the frequency of the second voltage waveform being 1 Hz or greater,
wherein the variable transmission film has a higher percent transmission at the initial optical state than the final optical state, when viewed through the variable transmission film.

2. The method according to claim 1, wherein the first voltage waveform has a frequency of 10 Hz.

3. The method according to claim 1, wherein the second voltage waveform has a frequency of 2 Hz.

4. The method according to claim 1, wherein the first voltage waveform has a greater frequency than the second voltage waveform.

5. The method according to claim 1, wherein the first and second voltage waveforms each have an amplitude from 20 to 150 V.

6. The method according to claim 1, wherein the first and second voltage waveforms each have an amplitude from 60 to 120 V.

7. The method according to claim 1, wherein the first and second voltage waveforms have an amplitude of 90 V.

8. The method according to claim 1, wherein the first and second voltage waveform each have a pulse duration less than or equal to 1500 ms.

9. The method according to claim 1, wherein the first and second voltage waveform each have a pulse duration less than or equal to 1000 ms.

10. The method according to claim 1, wherein the first and second voltage waveform each have a pulse duration less than or equal to 500 ms.

11. The method according to claim 1, wherein the percent transmission of the variable transmission film in the final optical state is less than or equal to 1.5%.

12. The method according to claim 1, wherein the electrophoretic material is encapsulated.

13. A variable transmission device comprising:
two light-transmissive electrodes;
a layer of electrophoretic material disposed between the two light-transmissive electrodes, the electrophoretic material comprising a fluid containing a plurality of charged particles capable of moving through the fluid upon application of an electric field between the two light-transmissive electrodes;
a controller connected to a power source and the two light-transmissive electrodes, the controller being configured to drive the variable transmission film according to the method of claim 1.

14. The variable transmission device of claim 13, wherein the electrophoretic material is encapsulated.

15. The variable transmission device of claim 13, further comprising a light-transmissive substrate.

\* \* \* \* \*